US 6,611,988 B1

(12) United States Patent
De Block

(10) Patent No.: US 6,611,988 B1
(45) Date of Patent: Sep. 2, 2003

(54) WIPER BLADE FOR THE GLASS SURFACES OF A MOTOR VEHICLE

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,482

(22) PCT Filed: May 19, 2000

(86) PCT No.: PCT/DE00/01618

§ 371 (c)(1),
(2), (4) Date: May 14, 2001

(87) PCT Pub. No.: WO00/73111

PCT Pub. Date: Dec. 7, 2000

(30) Foreign Application Priority Data

| May 28, 1999 | (DE) | ......................................... 199 24 661 |
| Aug. 13, 1999 | (DE) | ......................................... 199 38 400 |

(51) Int. Cl.⁷ .............................. B60S 1/40; B60S 1/38
(52) U.S. Cl. .................................. 15/250.32; 15/250.43; 15/250.351
(58) Field of Search .................... 15/250.32, 250.43, 15/250.44, 250.37, 250.361, 250.351

(56) References Cited

U.S. PATENT DOCUMENTS

| 3,179,969 A | * | 4/1965 | Glynn ..................... 15/250.32 |
| 3,192,551 A | * | 7/1965 | Appel ..................... 15/250.43 |
| 3,317,945 A | * | 5/1967 | Ludwig ................... 15/250.43 |
| 3,845,519 A | | 11/1974 | Huver | |
| 5,553,962 A | * | 9/1996 | Eustache ................. 15/250.32 |

FOREIGN PATENT DOCUMENTS

| DE | 1028896 | * | 4/1958 | ............. 15/250.43 |
| DE | 1 505 357 | | 5/1969 | |
| DE | 197 29 865 A | | 1/1999 | |

* cited by examiner

Primary Examiner—Gary K. Graham
(74) Attorney, Agent, or Firm—Michael J. Striker

(57) ABSTRACT

A wiper blade is proposed, which is used for cleaning motor vehicle windows or glass. The wiper blade (10) is provided with an elongated, rubber-elastic wiper strip (16) that can be pressed against the window or glass (24) and that is disposed, parallel to the longitudinal axis, on one band face (14) of a bandlike-elongated, spring-elastic support element (12), and a coupling part (20) connected to the center portion of the support element is seated on the other band face (18) of the support element and has one hinge half (36), whose hinge axis (52) is oriented transversely to the length of the wiper blade (10). An improvement in wiper blade mounting and in the securing of the mounted wiper blade to a wiper arm provided with a hinge bolt is attained, if both this hinge half and the coupling means of the wiper blade are formed by a bearing recess (36) in the coupling part (20).

15 Claims, 3 Drawing Sheets

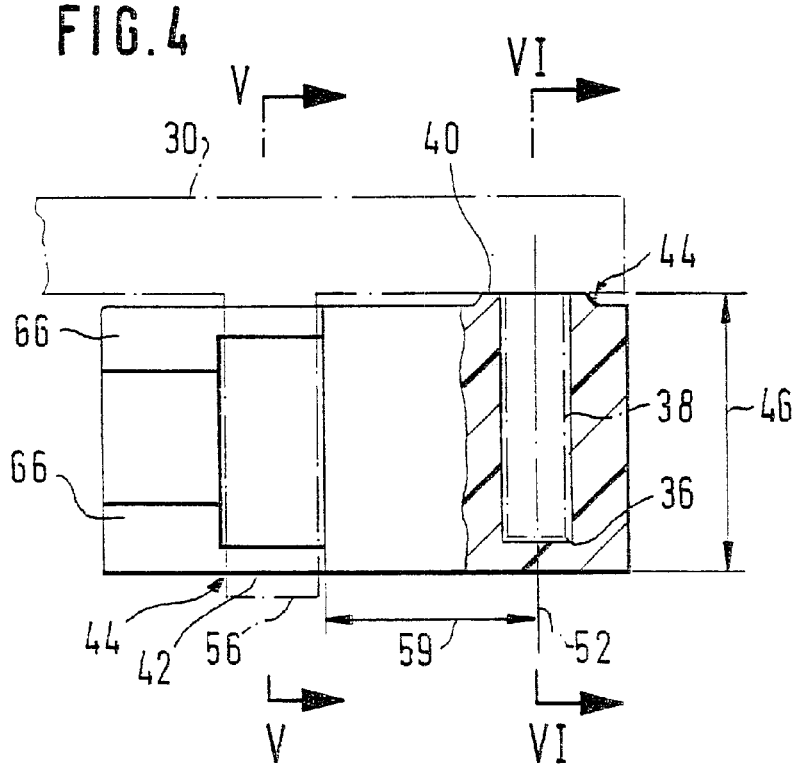
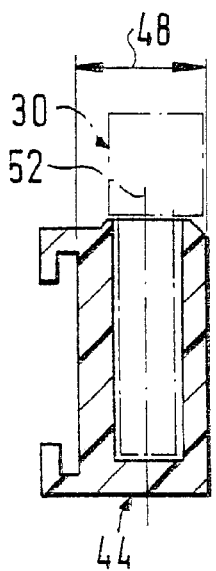
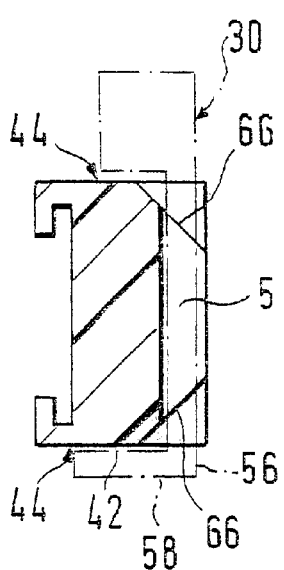
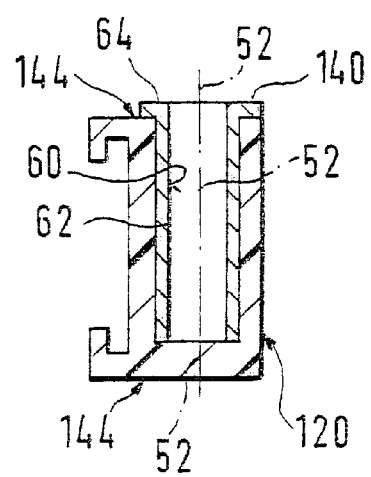

WIPER BLADE FOR THE GLASS SURFACES OF A MOTOR VEHICLE

BACKGROUND OF THE INVENTION

The support bracket frame wiper blades that have been in long, widespread use in wiping systems for motor vehicle windshields (German Patent DE-PS 15 05 397) have a great structural height, which under the flow conditions prevailing in front of the vehicle window, especially at a high travel speed, enhance the tendency of the wiper blade to lift away. At the least, this lessens the prescribed contact pressure of the wiper blade on the window so much that the wiping quality suffers as a result.

The invention is based on a very shallow wiper blade. In a known wiper blade of this type (German Patent Disclosure DE 19 72 98 65.6 A1), one hinge pin of nonround cross section is disposed on each of the two long sides of the coupling part, and the two hinge pins have a common hinge axis. The hinge half toward the wiper blade that is thus formed cooperates with bearing bores on the wiper arm that form the hinge half of the wiper arm; the bearing bores are each open at the periphery via an introduction channel, and the channel width is adapted to the smaller pin diameter. The design of the hinge is such that during wiper operation, the hinge pins cannot move out of their bearing bores. If the wiper blade is to be removed from the wiper arm, for instance if a worn wiper blade is to be replaced by a new one, then first the wiper arm has to be folded out of the way of the window or glass, so that the wiper blade can be put into its mounting, position, In which the hinge pin can be passed through the insertion channels and the wiper blade can be separated from the arm. If this is done improperly, however, the wiper blade can on route by itself in the hinge even while the arm is being folded out of the way, and thus the blade can separate from the wiper arm unintentionally and drop onto the vehicle body and cause damage there.

SUMMARY OF THE INVENTION

In the wiper blade according to the invention, it is possible to equip the wiper arm with a pin of round cross section, which can be introduced into the bearing recess in the direction of the hinge axis. The result is a coupling and hinge system in which the hinge bolt of the wiper arm is completely surrounded by the bearing recess of the wiper blade. The release of the wiper blade from the wiper arm is accomplished by pulling the wiper blade off the bearing bolt of the wiper arm in the direction of the hinge axis, any securing means that may be present must have been released beforehand. The embodiment of the hinge half toward the wiper blade and of the coupling means is especially advantageously employed in wiping systems in which the wiper arm blade and of the coupling means is especially advantageously employed in wiping systems in which the wiper arm and the wiper blade are disposed one behind the other in terms of the wiping direction. The embodiment of the wiper blade In the region of the coupling part is especially economical, which is significant in terms of the pricing of replacement wiper blades. Besides its function as a coupling means and as a hinge half, the opportunity also exists of using the bearing recess as an excellent positioning aid, when the wiper blade is passing through mounting or test systems during its production. For smooth wiper operation, it is of essential significance that the wiper arm coupling part has two cheek regions, extending in the longitudinal direction of the wiper blade and disposed upright relative to the window or glass, by each of which one cheek region is formed on one of the two long sides of the coupling part, and furthermore the spacing between the two cheek regions is between 16 NM and 25 NM. If guide or fitting faces that are defined once and for all result, against which counterpart faces of the wiper arm can be placed cleanly during wiping operation, so that a good outcome of wiping is assured. Because of the spacing range, measured in the wiping direction, of 16 mm to 25 mm, at the greatest dimension a minimization of any tilting motion of the wiper blade about its longitudinal axis is achieved when the wiper blade reverses Its wiping direction, which if the play is great can also be associated with a certain undesired noise production. On the other hand, the width of the wiper blade measured in the wiping direction must be not exceed a certain size, for styling reasons.

In practice it has been found that these problems are solved especially well if the spacing between the two cheek regions is between 20 mm and 23 mm.

For a special binding situation, a spacing of 22 mm, measured in the wiping direction, between the two cheek regions has proved extraordinarily favorable.

Especially for reasons of appearance, it is especially advantageous if the ratio between the length of the wiper blade and the spacing between the cheek regions is between the values of 1:22 and 1:33.

In a continuation of the concept of the invention, in terms of the longitudinal direction of the wiper blade, the bearing recess is disposed near one end of the coupling part, and the thickness of the coupling part between the one end region provided with the bearing recess and the other end of the coupling part is less, at least over a longitudinal portion, than the end portion of the coupling part that has the bearing recess. The thicker end of the coupling part that has the bearing recess assures the requisite stability in the region where the force is transmitted from the wiper arm to the wiper blade.

To secure the wiper blade against unintended release from the wiper arm even in a position folded away from the window or glass, measured in the longitudinal direction of the wiper blade, the spacing from the transverse bore via the transverse groove to one end of the wiper blade is greater than to the other end of the wiper blade.

If the longitudinal portion of the coupling part that has the lesser thickness is formed by a transverse groove in the coupling part that is open toward the side of the coupling part remote from the support element. This longitudinal portion can be used as a transitional channel for securing means of the wiper arm, which are operative, when the wiper blade is disposed next to the wiper arm in the wiping direction, on the side of the wiper blade remote from the wiper arm, yet without unfavorably affecting the low structural height of the wiper blade.

It has proved to be especially advantageous if one of the two cheek regions surrounds the orifice of the bearing recess, and that the other cheek region is disposed on the portion of the coupling part that has a lesser thickness than the end region of the coupling part that is provided with the bearing recess. The result, seen in the longitudinal direction of the wiper blade, is accordingly a spacing between the two fitting faces that has proved especially advantageous in terms of wiper blade guidance during wiping operation.

If the bearing recess is embodied as a blind bore, then soiling of this bearing point, which suffers high stress, can be reduced considerably.

If the aforementioned securing means of the wiper blade are adapted to the selected width of the groove of 8 mm to 10 mm, preferably 9 mm, the result for the wiper blade during wiping operation is a further improvement in stability as well as relief of the bearing point, when the securing means are braced on the groove walls that face one another.

In order for a spoiler surface, to be disposed on the wiper blade, to be continued in the region of the coupling part as well, at least one of the two long sides of the coupling part is provided with a chamfer over one portion. If both long sides of the coupling part are provided with a chamfer of this kind, then furthermore a simplification for mounting the wiper blade on the wiper arm can also be attained.

Advantages with regard to production costs for the wiper blade are obtained if the coupling part is made from a plastic.

It can be advantageous the bearing recess in the coupling part by the bore of a guide bush seated in the coupling part, a favorable combination of sliding partners with the material for the hinge bolt can be attained.

Further advantageous refinements and features of the invention are disclosed in the ensuing description of an exemplary embodiment, shown in the associated drawing.

BRIEF DESCRIPTION OF THE DRAWINGS

Shown in the drawing are:

FIG. 4, in plan view, partly in section, a coupling part shown in FIG. 3;

FIG. 5, a section through the coupling part taken along the line V—V of FIG. 4;

FIG. 6, a section through the coupling part taken along the line VI—VI of FIG. 4; and FIG. 7, a different version of the embodiment of the coupling part shown in FIG. 6.

DESCRIPTION OF THE PREFERRED EMBODIMENTS

Figure 1:
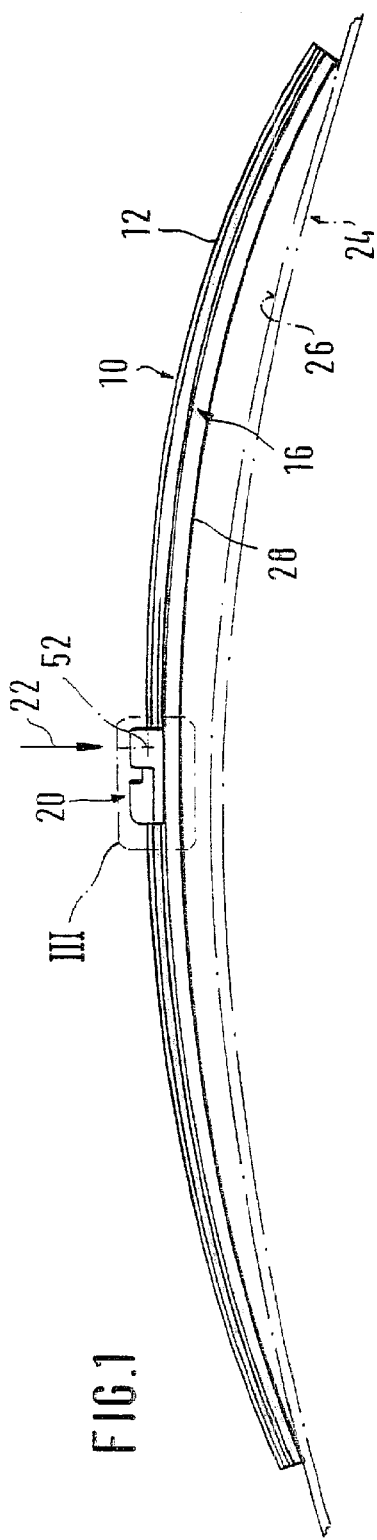
FIG. 1, a side view of a wiper blade of the invention.

The wiper blade 10 shown in FIG. 1 has a bandlike-elongated, spring-elastic support element 12 (FIG. 3), on whose underside 14 an elongated, rubber-elastic wiper strip 16 is secured parallel to the longitudinal axis. On the top side 18, remote from the windshield 24, of the support element 12, which can also be called a spring rail, the coupling part 20 toward the wiper blade of a connection device is disposed in the middle portion of the support element; with the aid of this connection device, the wiper blade 10 can be pivotably and releasably connected to a driven wiper arm. To that end, the wiper arm is provided on its free end with a part of the connection device that belongs to the wiper arm. The wiper arm and thus also the wiper blade 10 are urged in the direction of the arrow 22 toward the window 24 (indicated by dot-dashed lines in FIG. 1) to be wiped of a motor vehicle; the surface of this window has been identified by reference numeral 26 in FIG. 1. Since the line 26 is intended to represent the greatest curvature of the window surface, it is quite apparent that the curvature of the still-unloaded wiper blade 10 resting with both ends on the window 24 is greater than the maximum window curvature (FIG. 1). Under the contact pressure (arrow 22), the wiper blade 10 presses over its full length with its wiper lip 28 against the window surface 26. In the process, a tension builds up in the spring-elastic, metal support element 12 that provides for proper contact of the wiper strip 16, or wiper lip 28, over its entire length with the window, as well as a uniform distribution of the contact pressure. A wiper blade designed in this way is considerably shallower than a so-called support bracket frame wiper blade, as already noted at the outset here. The advantages of a wiper blade that is provided with a spring rail 12 instead of a support frame are considered to be especially its invulnerability to the tendencies to lift away from the window, which tendencies are unavoidable in support bracket frame wiper blades of greater height. Since the window, which as a rule is spherically curved, does not represent a portion of a spherical surface, the wiper blade 10 must be constantly capable of adapting to the position of the window surface at the time during its wiping motion with regard to the wiper arm 30. The connection device is therefore simultaneously embodied as a hinge connection between the wiper blade 10 and the wiper arm 30 (represented in dot-dashed lines in FIG. 2).

Figure 2:
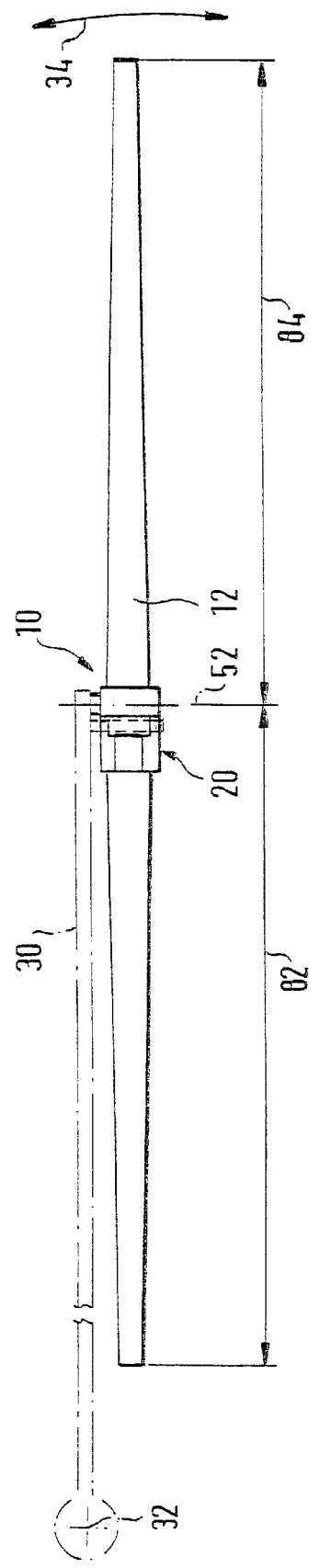
FIG. 2, a plan view on the wiper blade of FIG. 1, with the wiper arm indicated by dot—dashed lines.

During wiping operation, the wiper arm 30 swings back and forth about a pendulum axis 32 (FIG. 2), so that transversely to its length, the wiper blade 10 is displaced over the window 24 in the direction of a double arrow 34 shown in FIG. 2.

The special design of the wiper blade 10 will now be described in further detail. As the drawing shows, the coupling part 20 of the wiper blade is seated in the middle portion of the bandlike-elongated support element 12, specifically on its upper band face 18 remote from the window. The wiper strip 16 is disposed on the other, lower band face 14. Regardless of the fact that the support element 12 in the exemplary embodiment is shown as a one-piece spring band, it can also be constructed as needed from a plurality of individual or partial elements. The coupling part 20, solidly connected to the support element 12, is provided, near one end region, with a transverse bore 36, which in the embodiment of FIG. 4 is in the form of a blind bore, and which forms the hinge half toward the wiper blade of a hinge that permits a relative motion between the wiper arm and the wiper blade in a plane perpendicular to the window 24. The transverse bore 36 accordingly acts as a bearing recess, for instance for a hinge bolt 38 (FIG. 4), shown in dot-dashed lines, disposed laterally on the wiper arm 30. Along with its function as a bearing recess for the hinge bolt, the transverse bore 36 also forms the coupling means of the wiper blade, by way of which coupling means the wiper blade 10 can be connected operationally securely to the wiper arm 30.

The coupling part 20 is provided with two cheek regions 40 and 42, extending in the longitudinal direction of the wiper blade 10 and disposed perpendicular to the window; one cheek region is disposed on each of the two long sides 44 of the coupling part. The spacing 46 measured in the wiping imp direction (double arrow 34) between the two cheek regions 40 and 42 has particular significance, as will be addressed hereinafter. One purpose of the cheek regions 40 and 42 is that the wiper blade, in one wiping direction, can be braced with its cheek region 40 on a support face of the wiper arm 30, while the other cheek region 42 takes on this function in the converse motion of the wiper blade. To assure the least possible tilting motion of the wiper blade about its longitudinal axis at the moment of reversal of the direction of wiping, the greatest possible spacing 46 is desired. On the other hand, an excessive spacing 46 impairs the appearance of the wiper blade or the harmony in front view of the motor vehicle equipped with such a wiper blade. In weighing these two criteria, it has proved advantageous if the spacing 46 between the two cheek regions is between 16 and 25 mm. It has also been found that the ratio between the length of the wiper blade and the spacing 46 between the two cheek regions, also for reasons of appearance, should if at all possible be in the range between the values of 1:22 and 1:33. To cover a broad range of wiper blades sold, a spacing 46 between the two cheek regions 40 and 42 that is between 20 and 23 mm is thus appropriate. For a particular, special application, a spacing 46 of 22 mm has proved to be, extraordinarily advantageous.

Figure 3:
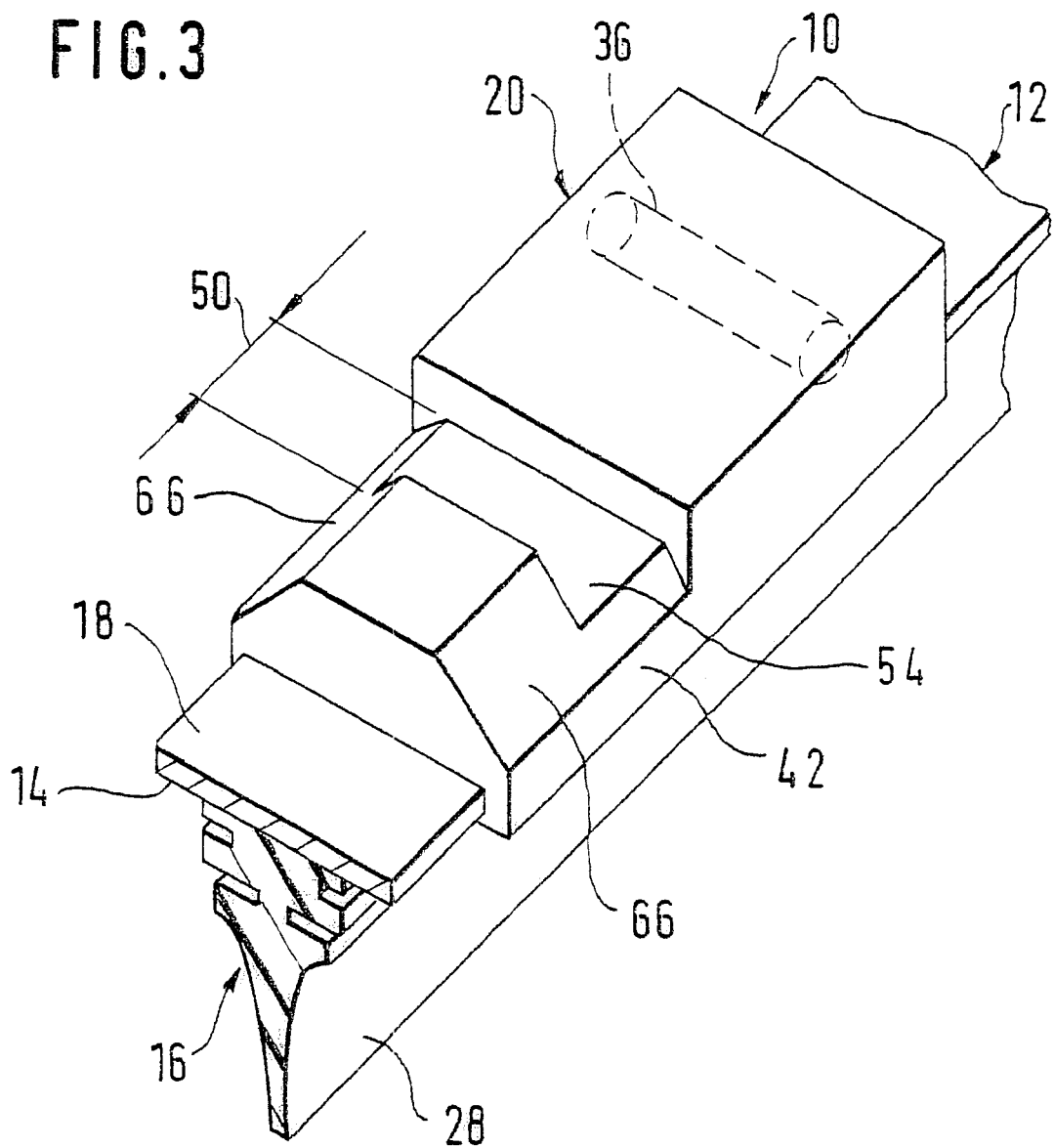
FIG. 3, an isometric, enlarged view of a detail marked III in FIG. 1.

As FIGS. 3 and 4 show, the blind transverse bore 36 that can be called a bearing recess is disposed in the coupling part 20 near one end thereof. In this region (FIG. 6), the thickness 48 of the coupling part, measured outward from the top side 18 of the coupling part 20, is greater than in another region of the coupling part. It can be seen especially from FIG. 3 that the coupling part 20 is considerably shallower over a longitudinal portion 50 than in the region of the bearing recess 36. This longitudinal portion 50 is formed by the width of a transverse groove 54, which is open toward the side of the coupling part remote from the support element 12. In the exemplary embodiment, it is of special significance that one region 40 of the two cheek regions 40, 42 is embodied as a bearing eyelet that protrudes in the direction of the hinge axis 52 and that surrounds the orifice of the transverse bore 36. The other cheek region 42 is located in the region of the long side 44 of the coupling part where the transverse groove 54 discharges or ends. It is accordingly also located where the coupling part 20 has a lesser thickness than at the end region of the coupling part 20 that is provided with the bearing recess 36. The width 50 of the transverse groove 54, measured in the longitudinal direction of the wiper blade, is 9 mm in the exemplary embodiment. The result is a sufficiently wide free space for the transition of a securing hook 56, connected to and belonging to the wiper arm 30, which hook fits with a leg 58 bent perpendicular relative to the window and thus fits over the wiper blade 10 in the region of the transverse groove 54 and with its leg 58 cooperates with the cheek region 42, when the wiper blade executes its working motion. A width of 9 mm for the transverse groove 54 makes a suitably stable embodiment of the securing hook 56 possible; this hook crosses the wiper blade in the transverse groove 54 without thereby unfavorably affecting the structural height of the wiper blade 10.

The coupling part 20 of FIGS. 3–6 is made from a plastic, and the transverse bore 36 is molded directly into the blocklike coupling part, and the bearing eyelet is formed onto the coupling part.

To optimize the sliding properties between the hinge bolt 38 toward the wiper arm and the wall of the transverse bore 36 that acts as its sliding partner, it can be advantageous if the transverse bore 36 is formed by the central bore 60 of a guide or slide bush 62 that is seated in the coupling part 120. For the same reason, the guide bush 62 can be provided with an annular collar 64, which protrudes from the long side 144 of the coupling part oriented toward the wiper arm 30 and which thus instead of the bearing eyelet forms a cheek region 140 that corresponds to the cheek region 40 of the version already described. This is naturally also true whenever a separate annular disk is provided instead of the annular collar. Such an embodiment is shown in FIG. 7.

Because the bearing bore or transverse bore 36 is disposed at a certain spacing 59 from the transverse groove 54 (FIG. 4), the result naturally is a corresponding spacing 59 between the two cheek regions 40 and 42, or 140 and 42, as a result of which still further improvement in wiper blade guidance is attained.

From FIG. 2 it can be seen that the spacing 82, measured in the longitudinal direction of the wiper blade 10, between the transverse or bearing bore 36, or the hinge axis 52, via the transverse groove 54 to one end of the wiper blade 10 is greater than the spacing 84 from the hinge axis 52 to the other end of the wiper blade. Because of the thus-defined center of gravity shifted toward one end of the wiper blade, when the wiper blade 10 has been folded away from the window 24 a moment occurs that rotates the wiper blade about the hinge axis 52 in the direction of the arrow 86, so that this always remains with its cheek regions 40, 42 of the coupling part 20 between the securing means 30, 56 of the wiper arm 30 and is thus secured against unintended separation from the wiper arm.

Because the operating position of the wiper blade 10 between the securing means of the wiper arm is specified in compulsory fashion, the blade cannot be installed the wrong way around, since if an attempt is made to do so, the readily visible operating position between the wiper arm and the wiper blade cannot be attained.

In certain applications, the wiper blade 10 can be provided with a so-called spoiler strip, known per se, on the top side 18 of the support element 12. In such applications, it can be advantageous if at least one of the two long sides 44 or 144 of the coupling part is provided over one portion with a chamfer 66, which in this portion of the wiper blade takes on the function of the spoiler strip. If both long sides of the coupling part are equipped with a chamfer 66 of this kind, then mounting can furthermore be made easier when the wiper blade 10 is to be connected to the wiper arm.

What is claimed is:

1. A wiper blade for cleaning motor vehicle windows and glass, having an elongated, rubber-elastic wiper strip (16) that can be pressed against the window and glass (24) and that is disposed, parallel to a longitudinal axis, on one band face (14) of a band-shaped-elongated, spring-elastic support element (12), and a coupling part (20) connected to a center portion of the support element is seated on another band face (18) of the support element and has one hinge half, whose hinge axis (52) is oriented transversely to a length of the wiper blade (10), wherein both this hinge half and coupling means of the wiper blade are formed by a bearing recess (36) in the coupling part (20), and the coupling part (20) is considerably shallower over a longitudinal portion than a longitudinal region of the bearing recess (36), and wherein the longitudinal portion (50) is formed by a width of a transverse groove (54).

2. The wiper blade of claim 1, wherein the wiper arm coupling part (20) has two cheek regions (40 and 42, and 64), extending in a longitudinal direction of the wiper blade (10) and disposed upright relative to the window and glass (24), by each of which one cheek region is formed on one of two longitudinal sides (44) of the coupling part, and that a spacing (46) between the two cheek regions is between 16 mm and 25 mm.

3. The wiper blade of claim 2, characterized in that the spacing (46) between the two cheek regions (40 and 42) is between 20 mm and 23 mm.

4. The wiper blade of claim 2 characterized in that the spacing (46) between the two cheek regions (40 and 42) is 22 mm.

5. The wiper blade of claim 2, wherein in a ratio between a length of the wiper blade (10) and the spacing (46) between the cheek regions (40 and 42) is between values of 1:22 and 1:33.

6. The wiper blade of claim 2, wherein one (40) of the two cheek regions (40, 42) surrounds an orifice of the bearing recess (36), and that the other of the two cheek regions (42) is disposed on a portion of the coupling part that has a lesser thickness than an end region of the coupling part that is provided with the bearing recess (36).

7. The wiper blade of claim 6, wherein the bearing recess (36) is embodied as a blind bore.

8. The wiper blade 1, wherein at least one of two long sides (44) of the coupling part is provided with a chamfer (66) over one portion.

9. The wiper blade of claim 1, wherein the coupling part (20) is made from a plastic.

10. The wiper blade of claim 9, wherein the bearing recess is formed by a bore (60) of a guide bush (62) seated in the coupling part.

11. A wiper blade for cleaning motor vehicle windows and glass, having an elongated, rubber-elastic wiper strip (16) that can be pressed against the window and glass (24) and that is disposed, parallel to a longitudinal axis, on one band face (14) of a band-shaped-elongated, spring-elastic support element (12), and a coupling part (20) connected to a center portion of the support element is seated on another band face (18) of the support element and has one hinge half, whose hinge axis (52) is oriented transversely to a length of the wiper blade (10), wherein both this hinge half and coupling means of the wiper blade are formed by a bearing recess (36) in the coupling part (20) and in a longitudinal direction of the wiper blade (10), the bearing recess (36) is disposed near one end of the coupling part (20), and that a thickness of the coupling part (20) between one end region provided with the bearing recess and another end of the coupling part is less, at least over a longitudinal portion (50), than an end portion of the coupling part that has the bearing recess.

12. The wiper blade of claim 11, wherein a longitudinal portion is formed by a transverse groove (54) in the coupling part (20), the groove (54) is open toward a side of the coupling part (20) remote from the support element (12).

13. The wiper blade of claim 12, wherein a width (54) of the transverse groove (50) is from 8 mm to 10 mm.

14. The wiper blade of claim 12, wherein the width (54) of the transverse groove (50) is a 9 mm.

15. A wiper blade for cleaning motor vehicle windows and glass, having an elongated, rubber-elastic wiper strip (16) that can be pressed against the window and glass (24) and that is disposed, parallel to a longitudinal axis, on one band face (14) of a band-shaped-elongated, spring-elastic support element (12), and a coupling part (20) connected to a center portion of the support element is seated on another band face (18) of the support element and has one hinge half, whose hinge axis (52) is oriented transversely to a length of the wiper blade (10), wherein both this hinge half and coupling means of the wiper blade are formed by a bearing recess (36) in the coupling part (20), wherein measured in a longitudinal direction of the wiper blade (10), the spacing (82) from the bearing recess (36) via a transverse groove (54) to one end of the wiper blade (10) is greater than the spacing (84) to another end of the wiper blade.

\* \* \* \* \*